(12) United States Patent
Rambo et al.

(10) Patent No.: US 12,331,703 B2
(45) Date of Patent: Jun. 17, 2025

(54) PROPULSION SYSTEM USING RAMJET BLEED AIR FOR GAS TURBINE COMBUSTION

(71) Applicant: General Electric Company, Schenectady, NY (US)

(72) Inventors: Jeffrey D. Rambo, Mason, OH (US); Scott G. Edens, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/065,137

(22) Filed: Dec. 13, 2022

(65) Prior Publication Data
US 2024/0191674 A1 Jun. 13, 2024

(51) Int. Cl.
*F02K 7/16* (2006.01)

(52) U.S. Cl.
CPC ............ *F02K 7/16* (2013.01); *F05D 2220/10* (2013.01); *F05D 2220/80* (2013.01)

(58) Field of Classification Search
CPC ....................................................... F02K 7/16
See application file for complete search history.

(56) References Cited

U.S. PATENT DOCUMENTS

| | | | |
|---|---|---|---|
| 3,176,462 A * | 4/1965 | Eckert ....................... | F02K 7/16 60/767 |
| 3,296,800 A * | 1/1967 | Keenan et al. .......... | F02K 7/16 60/761 |
| 3,552,873 A | 1/1971 | Ghougasian | |
| 3,792,584 A * | 2/1974 | Klees ........................ | F02K 7/16 60/226.3 |
| 3,834,161 A * | 9/1974 | Quigley, Jr. .............. | F02K 7/16 60/244 |
| 3,940,926 A * | 3/1976 | Craig ...................... | F02C 7/042 60/269 |
| 4,052,845 A * | 10/1977 | Tumavicus ............. | F02K 3/075 60/226.3 |
| 7,762,077 B2 | 7/2010 | Pederson et al. | |
| 9,567,913 B2 | 2/2017 | Ekanayake et al. | |

(Continued)

FOREIGN PATENT DOCUMENTS

| FR | 3127269 A1 | 3/2023 |
|---|---|---|
| FR | 3130896 A1 | 6/2023 |

(Continued)

*Primary Examiner* — Ted Kim
(74) *Attorney, Agent, or Firm* — Carter, DeLuca & Farrell LLP; George Likourezos; Jason B. Scher

(57) ABSTRACT

A propulsion system includes a turbine engine and a ramjet engine. A turbine engine inlet section restriction device permits an inlet airflow to a turbine engine inlet in a first (low speed) operating state of the propulsion system, and restricts the inlet airflow to the turbine engine inlet in a second (high speed) operating state of the propulsion system. A combustor inlet flow control device, in the first operating state, provides an airflow from a compressor to the turbine engine combustor, and restricts an airflow from a ramjet bleed air passage, and, in the second operating state, provides a ramjet inlet bleed airflow to the turbine engine combustor, while restricting airflow from the compressor. In the second operating state, the turbine engine drives at least one accessory gearbox to drive at least one accessory component.

18 Claims, 11 Drawing Sheets

(56) References Cited

U.S. PATENT DOCUMENTS

| | | |
|---|---|---|
| 10,400,680 B2 | 9/2019 | Asari et al. |
| 10,704,466 B2 | 7/2020 | Dierksmeier |
| 10,780,385 B2 | 9/2020 | Kippel et al. |
| 10,794,282 B2 | 10/2020 | Dierksmeier et al. |
| 10,934,942 B2 | 3/2021 | Dierksmeier et al. |
| 11,242,798 B2 | 2/2022 | Haynes et al. |
| 2006/0242941 A1* | 11/2006 | Johnson .................. F02K 3/075 60/761 |
| 2018/0017017 A1 | 1/2018 | Tomlinson et al. |
| 2020/0386189 A1 | 12/2020 | Powell et al. |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

\* cited by examiner

PROPULSION SYSTEM USING RAMJET BLEED AIR FOR GAS TURBINE COMBUSTION

TECHNICAL FIELD

The present disclosure relates to a propulsion system that uses ramjet bleed air for gas turbine combustion.

BACKGROUND

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut off airflow to the gas turbine engine, and generally shutdown the gas turbine engine once the ramjet engine is ignited and operational. The gas turbine engine may be made operational once again when the airspeed decreases to an acceptable level for operation of the gas turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

An aircraft may include a propulsion system, such as a gas turbine engine, a ramjet engine, or a scramjet engine. Aircraft that may be designed for a high Mach number may include a combined propulsion system that includes, for example, a gas turbine engine for low Mach number operations and a ramjet engine for high Mach number operations. Such a combined propulsion system may cut off airflow to the gas turbine engine, and generally shutdown the gas turbine engine once the ramjet engine is ignited and operational. The gas turbine engine may be made operational once again when the airspeed decreases to an acceptable level for operation of the gas turbine engine.

The present disclosure provides a propulsion system that includes both a turbine engine and a ramjet jet engine or a scramjet engine in a manner that allows a turbine section of the gas turbine engine to remain operational during ramjet/scramjet propulsion so that the gas turbine engine can continue to drive various accessories (e.g., a generator, an oil system, or environmental systems). According to the present disclosure, in a high speed operating state, an inlet to the gas turbine engine may be closed-off so that inlet airflow is restricted from entering the inlet, and an outlet from a compressor of the gas turbine engine may be closed-off so that a high pressure outlet flow from the compressor does not flow downstream to a combustor of the gas turbine engine. Rather, ramjet bleed air from a ramjet inlet of the ramjet engine may be diverted from the ramjet inlet to the combustor of the gas turbine engine. The ramjet bleed air is mixed with fuel in the gas turbine combustor and burned so as to drive a turbine section of the gas turbine engine. The turbine section drives the compressor section, which, in turn, drives the accessories, such as an auxiliary generator to provide electrical power, for example, to the aircraft.

Figure 1:
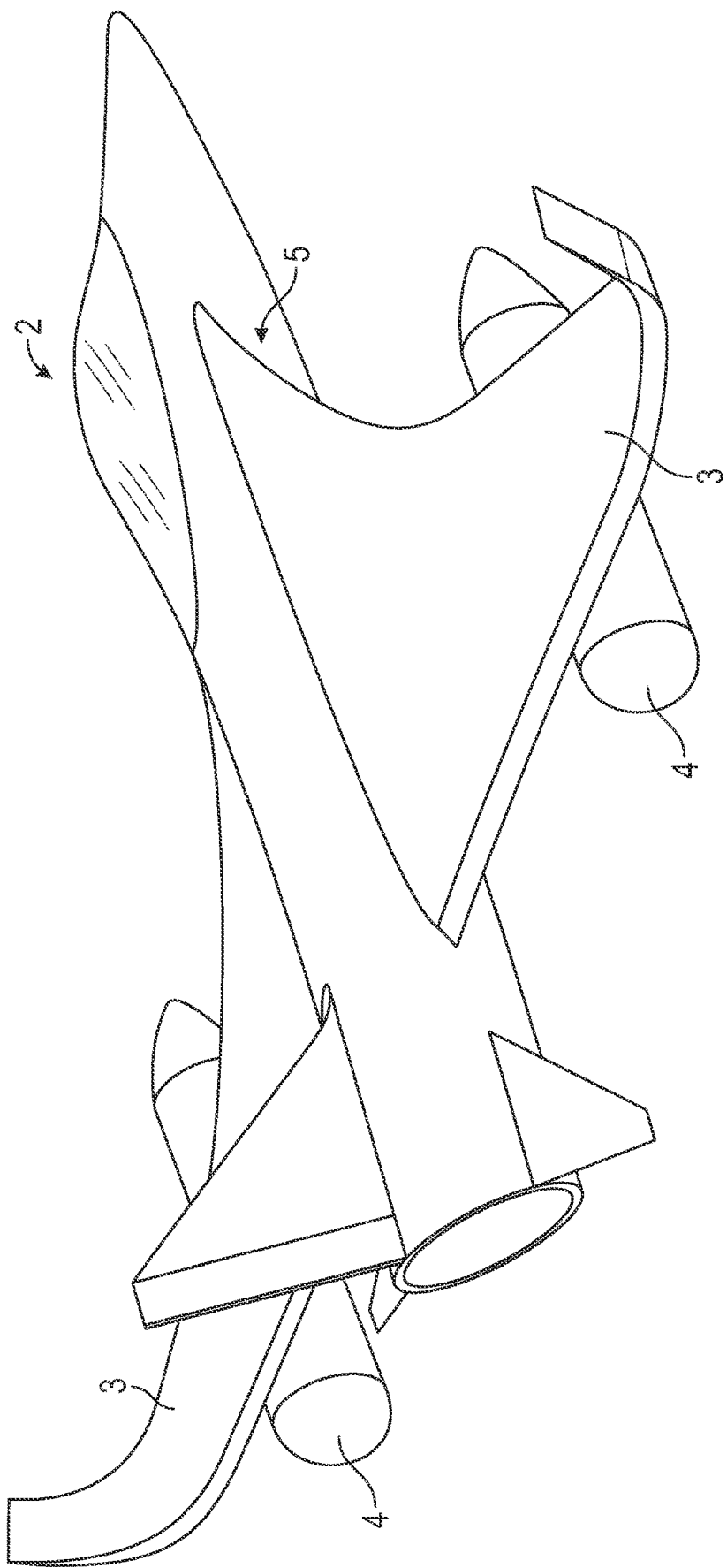
FIG. 1 is a top rear perspective view of an exemplary aircraft in which the propulsion system of the present disclosure may be implemented, according to an aspect of the present disclosure.

Referring now to the drawings, FIG. 1 is a perspective top rear view of an exemplary aircraft 2 (which may also be referred to as a flight vehicle) in which the propulsion system of the present disclosure may be implemented, according to an aspect of the present disclosure. The aircraft 2 of FIG. 1 may be designed for supersonic flight operations, or may be designed for hypersonic flight operations. As shown in FIG. 1, the aircraft 2 includes at least one propulsion system 4. In FIG. 1, two propulsion systems 4 are shown as being implemented in the aircraft 2, but fewer than two, or more than two, propulsion systems 4 may be implemented instead. In addition, FIG. 1 depicts the propulsion system 4 as generally being attached to an underside of a wing 3 of the aircraft 2, but the propulsion system 4 may be embedded within the wing 3 instead, or may be embedded within a fuselage 5 of the aircraft 2.

Figure 2:
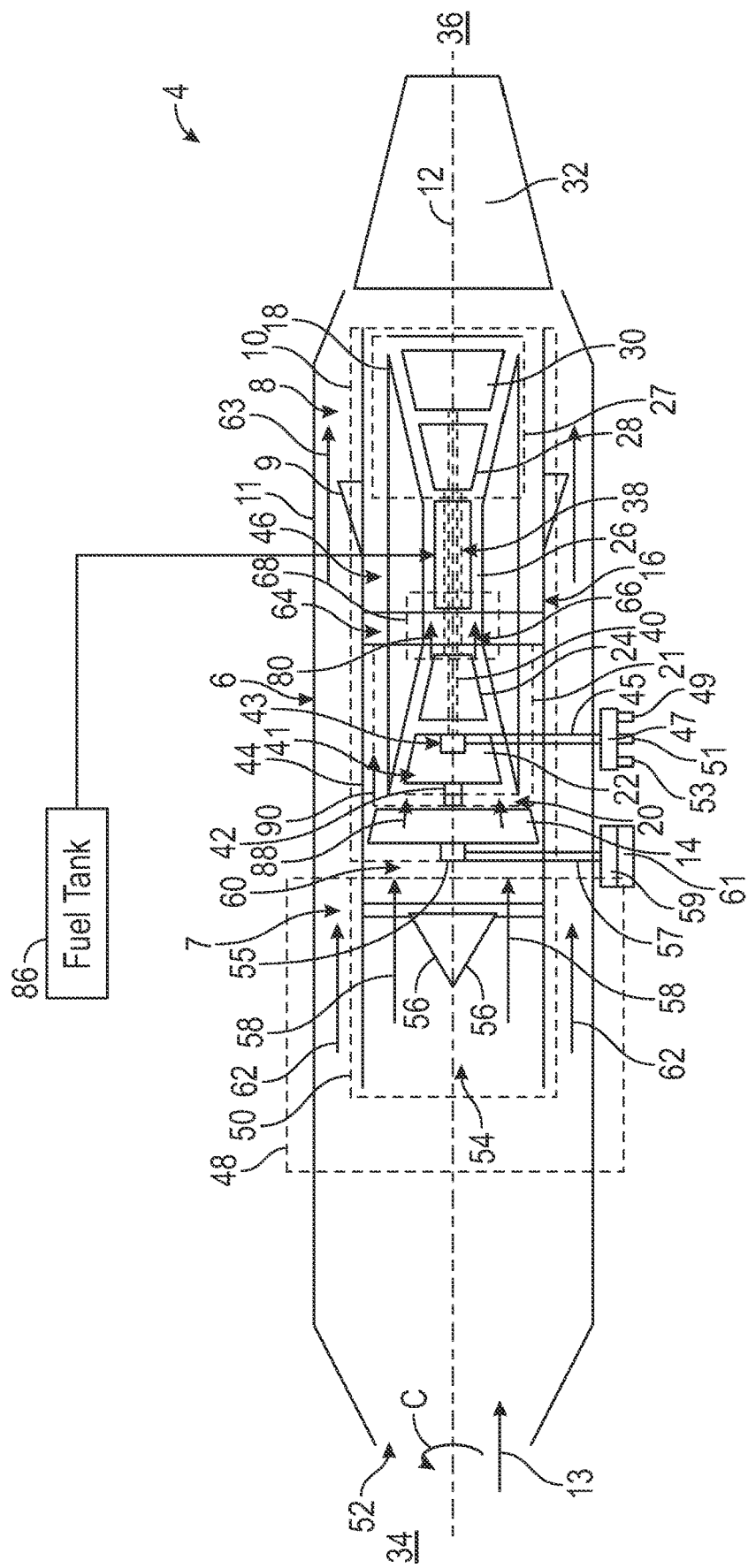
FIG. 2 is a schematic block layout of an exemplary propulsion system, according to an aspect of the present disclosure.

FIG. 2 is a schematic block layout of an exemplary propulsion system 4, according to an aspect of the present disclosure. The propulsion system 4 may include a ramjet engine 6 and a turbine engine 10. The turbine engine 10 may be, for example, a turbofan engine or a turbojet engine, as but a few examples. As shown in FIG. 2, propulsion system 4 has a longitudinal centerline axis 12 that extends therethrough from an upstream end 34 of the propulsion system 4 to a downstream end 36 of the propulsion system 4 for reference purposes. The longitudinal centerline axis 12 may also represent a longitudinal centerline axis of the ramjet engine 6 and/or a longitudinal centerline axis of the turbine engine 10. The ramjet engine 6 may generally be defined between a ramjet outer casing 11 of the propulsion system 4 and the turbine engine 10. In the FIG. 2 aspect, the ramjet engine 6 may extend circumferentially in a circumferential direction C about the longitudinal centerline axis 12, and the ramjet engine 6 may include a ramjet inlet portion 7 and a ramjet combustor 8. Thus, the ramjet engine 6 is arranged in parallel with the turbine engine 10. However, the ramjet engine 6 need not extend circumferentially about the turbine engine 10, and may be a separate engine defined by another shape (e.g., a square or rectangular shape) extending along at least a portion of the length of the turbine engine 10 that is arranged parallel with the turbine engine 10. As will be described in more detail below, a ramjet inlet airflow 62, which may constitute a portion of an inlet airflow 13 to the propulsion system 4, may pass through the ramjet inlet portion 7 to the ramjet combustor 8, where fuel may be injected by one or more ramjet fuel injectors 9 (two shown in FIG. 2) into the ramjet combustor 8 to mix with the ramjet inlet airflow 62 and to be ignited and burned to provide ramjet propulsion.

In FIG. 2, the turbine engine 10 is depicted as constituting a turbofan engine and, therefore, the following description will focus on a turbofan engine being included within the propulsion system 4. The turbine engine 10 may include a fan assembly 14 and a core engine 16 disposed downstream from the fan assembly 14. The core engine 16 may generally include a core engine outer casing 18 that defines an annular inlet 20. The core engine outer casing 18 encases, in serial flow relationship, a compressor section 21 that includes a low pressure (LP) compressor 22 and a high pressure (HP) compressor 24, a turbine engine combustor 26, a turbine section 27 that includes a high pressure (HP) turbine 28 and a low pressure (LP) turbine 30, and a jet exhaust nozzle section 32. The jet exhaust nozzle section 32 may be a shared nozzle that is shared between the turbine engine 10 and the ramjet engine 6. A high pressure (HP) shaft assembly 38 drivingly couples the HP turbine 28 to the HP compressor 24, and a low pressure (LP) shaft assembly 40 drivingly couples the LP turbine 30 to the LP compressor 22. Together, the low pressure compressor 22, the low pressure turbine 30, and the low pressure shaft assembly 40 may be referred to as a low pressure spool 41 that rotate together as one element. The low pressure spool 41 may further be coupled to the fan assembly 14 via a fan shaft 42, with the fan assembly 14 being arranged upstream of the compressor section 21. While not shown in FIG. 2, a reduction gearbox may be implemented within the fan shaft 42 between the low pressure compressor 22 and the fan assembly 14 so as to function as a speed reducer between the low pressure spool 41 and the fan assembly 14. Thus, in normal operation of the turbine engine 10, the low pressure spool 41 drives the fan assembly 14. In addition, the low pressure spool 41 may be connected with a gearbox 43 that is drivingly connected via a driveshaft 45 to an accessory gearbox 47. The accessory gearbox 47 may drive various accessory components, such as an oil pump 49, a fuel pump 51, a hydraulic pump 53, and other accessories that are not shown. The fan assembly 14 may also be drivingly connected to a gearbox 55 that is drivingly connected to an auxiliary gearbox 59 via a driveshaft 57. The auxiliary gearbox 59 may include various accessories connected therewith, including, for example, an auxiliary generator 61. A fan casing 44 circumferentially surrounds the fan assembly 14 and/or at least a portion of the core engine 16 so as to define a bypass airflow passage 46 therebetween.

The propulsion system 4 is further seen to include an inlet section 48 that includes the ramjet inlet portion 7 and a turbine engine inlet portion 50. As will be described below, the inlet section 48 takes in the inlet airflow 13 at a propulsion system inlet 52 and provides the inlet airflow 13 to both the ramjet engine 6 and to the turbine engine 10. The propulsion system 4 depicted in FIG. 2 is a general configuration of the propulsion system 4 in a first (low speed) operating state. In the FIG. 2 aspect, the turbine engine inlet portion 50 is shown as including a turbine engine inlet section restriction device 54 that may include a plurality of airflow inlet doors 56 that can be actuated between an open position and a closed position. FIG. 2 depicts the airflow inlet doors 56 in the open position so as to allow a turbine inlet airflow 58 to flow through a turbine engine inlet 60 and to the fan assembly 14. Another portion of the inlet airflow 13 flows into the ramjet inlet portion 7 as a ramjet inlet airflow 62. The ramjet engine 6 further includes at least one ramjet bleed air passage 64 that is in airflow communication with the turbine engine combustor 26 of the turbine engine 10. As will be described below, the ramjet bleed air passage 64 provides for a portion of the ramjet inlet airflow 62 to be able to flow into the turbine engine combustor 26 of the turbine engine 10 during a second (high speed) operating state of the propulsion system 4.

Figure 3A:
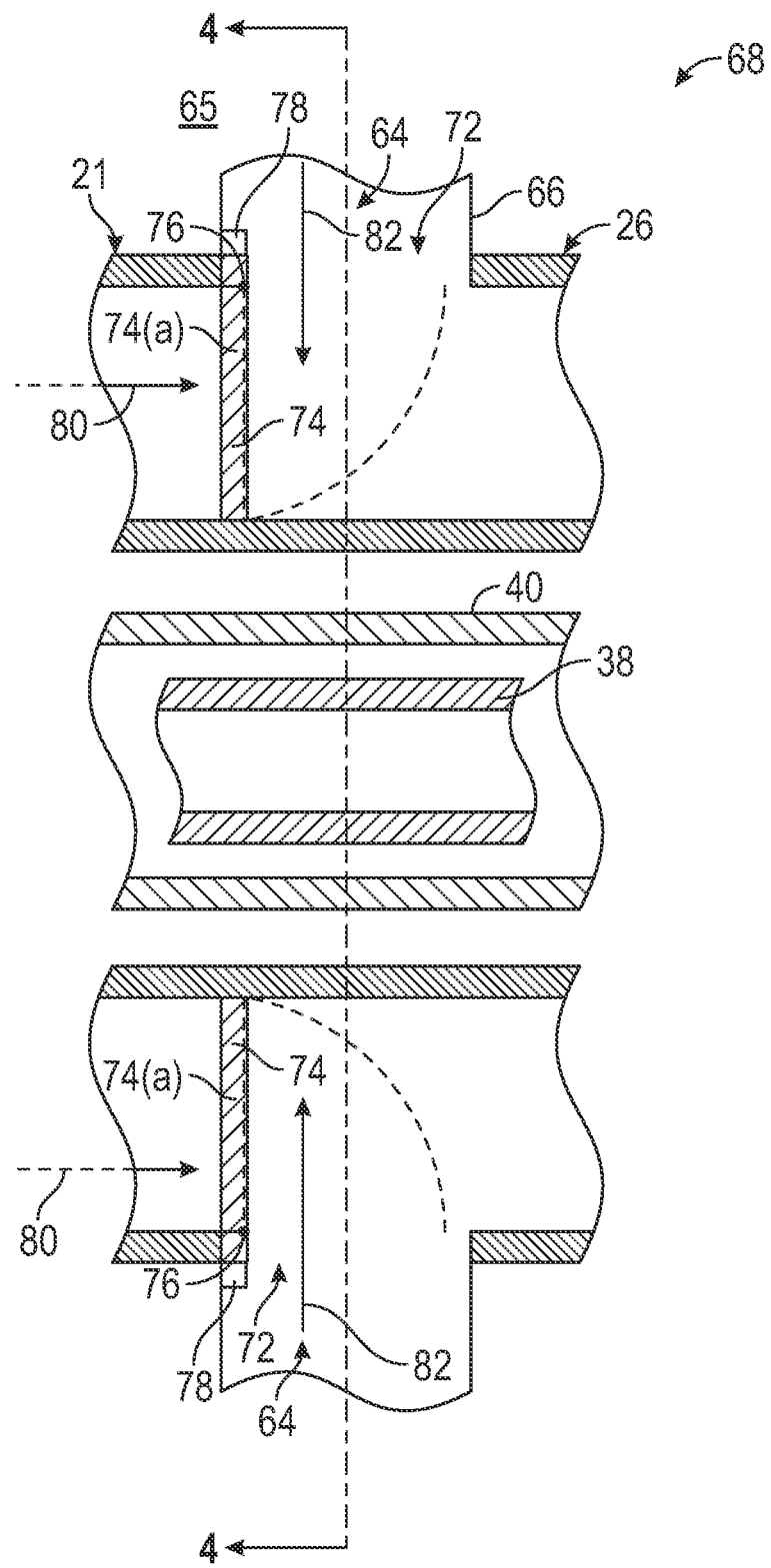
FIG. 3A is an enlarged cross-sectional view of a combustor inlet flow control device, taken at detail view 68 of FIG. 2, depicting a first position of flow controls doors according to an aspect of the present disclosure.
Figure 3B:
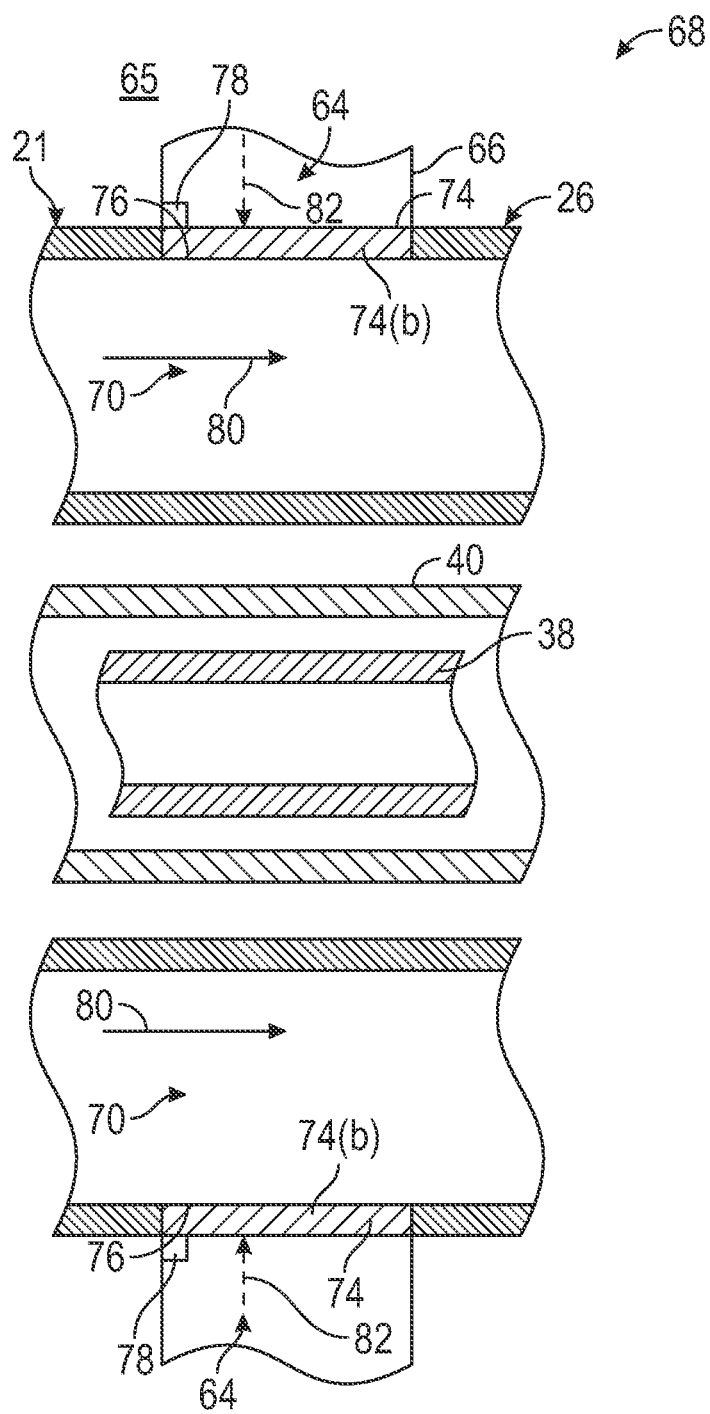
FIG. 3B is an enlarged cross-sectional view of a combustor inlet flow control device, taken at detail view 68 of FIG. 2, depicting a second position of flow control doors according to an aspect of the present disclosure.

The propulsion system 4 of FIG. 2 further includes a combustor inlet flow control device 66. FIG. 3A and FIG. 3B are enlarged cross-sectional views of the combustor inlet flow control device 66 taken at detail view 68 of FIG. 2. The combustor inlet flow control device 66 is arranged between the compressor section 21 and the turbine engine combustor 26, and includes a plurality of axial flow passages 70 arranged between the compressor section 21 and the turbine engine combustor 26, and a plurality of ramjet bleed air passages 72 that are radial airflow passages. A plurality of flow control doors 74 control airflow through the respective axial flow passages 70 and through the respective ramjet bleed air passages 72. More particularly, as shown in FIG. 3A, the plurality of flow control doors 74 may be hinged doors having a hinge 76, and an actuator 78 may control rotation of the flow control doors 74 about the hinge 76. In one aspect, the actuator 78 may be a torsion spring that, in a resting state, applies a torsional force to rotate the flow control door 74 to the position shown as flow control door 74(a) in FIG. 3A to close-off the axial flow passages 70. Alternatively, the actuator 78 may be a hydraulic or a pneumatic actuator that controls the rotation of the flow control doors 74. The position shown as the flow control door 74(a) may be referred to as a "closed position." In operation, when the turbine engine 10 is started-up in the first (low speed) operating state, pressure from compressed air 80 flowing from the compressor section 21 may apply a force against the flow control door 74 to force to flow control door 74 from the closed position (flow control door 74(a) in FIG. 3A) to an open position, shown as flow control door 74(b) in FIG. 3B, so as to open the axial flow passage 70 and to allow the compressed air 80 to flow to the turbine engine combustor 26. When the flow control doors 74 are actuated to the open position as shown in FIG. 3B, the ramjet bleed air passages 72 are closed off so that a ramjet inlet bleed airflow 82 is restricted from passing through the ramjet bleed air passages 72.

Figure 4:
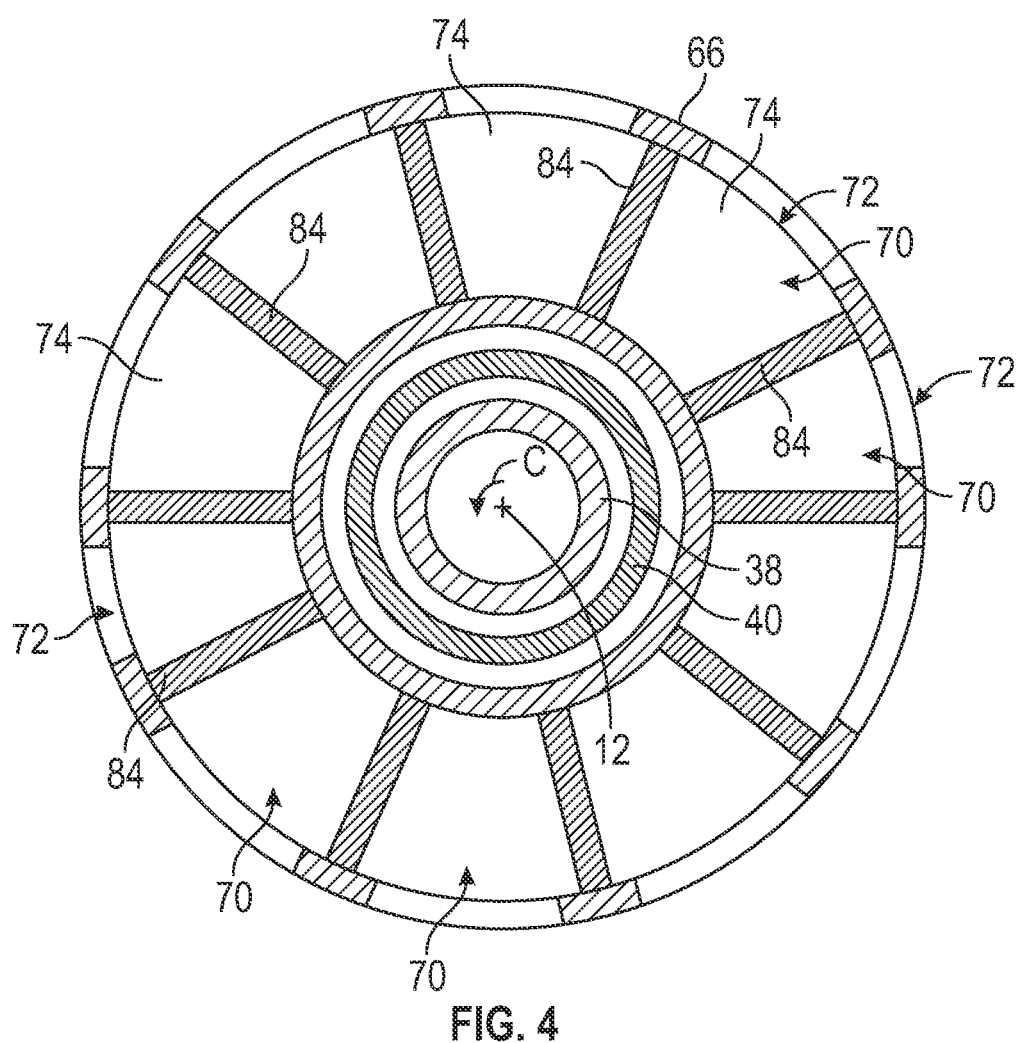
FIG. 4 is a partial cross-sectional view of the combustor inlet flow control device, taken at plane 4-4 of FIG. 3, according to an aspect of the present disclosure.

FIG. 4 is a partial cross-sectional view of the combustor inlet flow control device 66, taken at plane 4-4 of FIG. 3, according to an aspect of the present disclosure. As shown in FIG. 4, the combustor inlet flow control device 66 may include a plurality of circumferentially spaced guide vanes 84. The axial flow passages 70 are defined between the guide vanes 84, and the flow control doors 74 are arranged between the guide vanes 84. In addition, respective ones of the plurality of ramjet bleed air passages 72 are circumferentially aligned about the longitudinal centerline axis 12 with respective ones of the plurality of axial flow passages 70.

Figure 5:
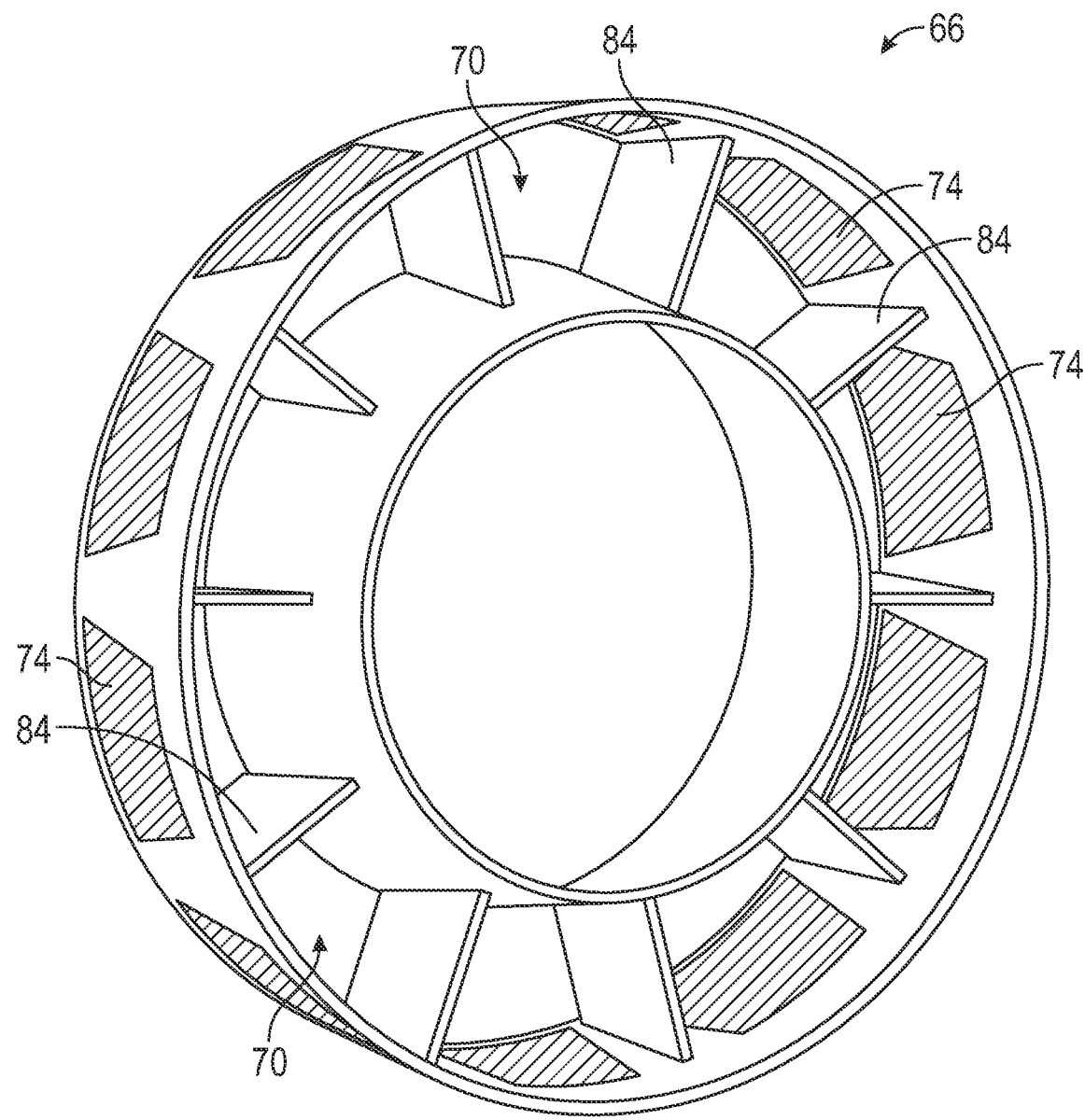
FIG. 5 is an aft forward-looking perspective view of a combustor inlet flow control device depicting flow control doors in an open position, according to an aspect of the present disclosure.

FIG. 5 is an aft forward-looking perspective view of the combustor inlet flow control device 66, depicting the flow control doors 74 in the open position (i.e., opening the axial flow passages 70 and closing the ramjet bleed air passages 72). While FIGS. 3A, 3B, 4 and 5 depict the combustor inlet flow control device 66 as including the flow control doors 74 for controlling the flow of the compressed air 80 from the compressor section 21 to the turbine engine combustor 26, and for controlling the ramjet inlet bleed airflow 82 to the turbine engine combustor 26, other configurations may be implemented instead. For example, rather than including the flow control doors 74, the guide vanes 84 may be made rotatable to control the airflow to the turbine engine combustor 26.

Figure 6B:
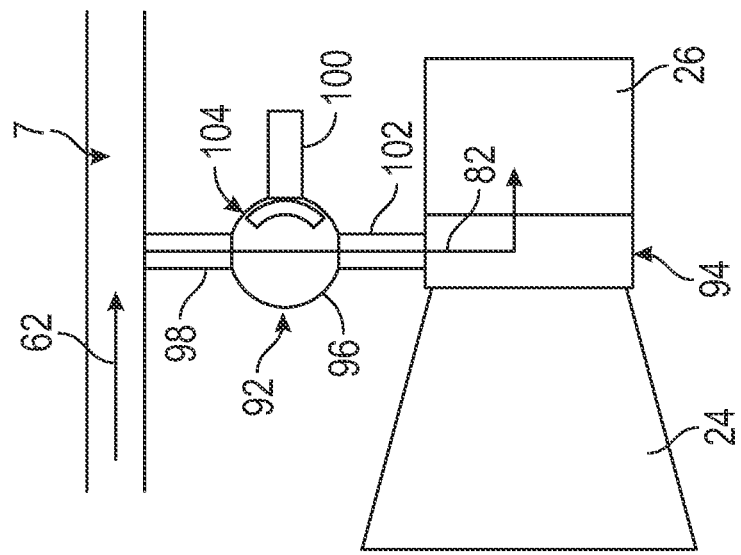
FIG. 6A and FIG. 6B depict an alternate example of a combustor inlet flow control device, according to another aspect of the present disclosure.
Figure 6A:
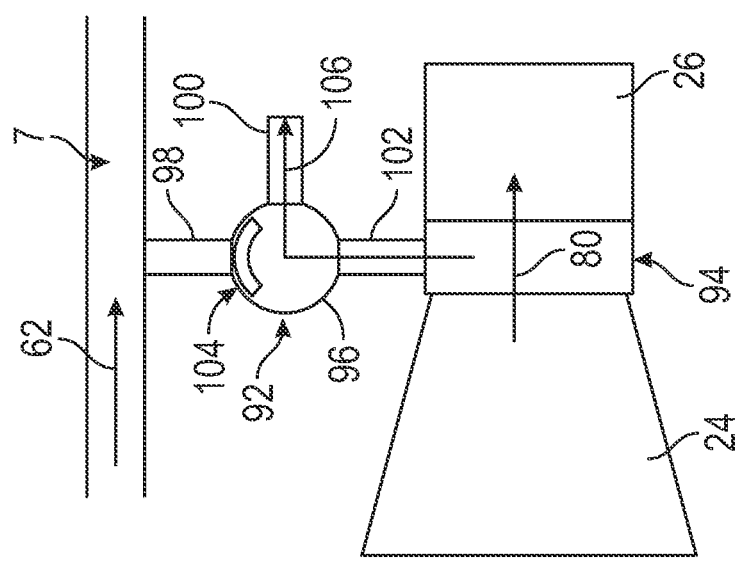

FIG. 6A and FIG. 6B depict an alternate example of a combustor inlet flow control device, according to another aspect of the present disclosure. In FIG. 6A and FIG. 6B, a combustor inlet flow control device 92 may constitute a part of a compressor bleed air system arranged at an outlet end 94 of the high pressure compressor 24. The combustor inlet flow control device 92 may include a bleed valve 96 having a ramjet bleed air inlet 98, a compressor bleed air outlet 100, and a bleed valve connector 102 connecting the bleed valve 96 with the outlet end 94 of the high pressure compressor 24. A flow control device (or a valve plate) 104 controls the flow of air through the bleed valve 96. FIG. 6A depicts an arrangement of the flow control device 104 in the first (low speed) operating state of the propulsion system 4. As was discussed above for FIG. 2, the turbine engine 10 is made operational in the first operating state, and compressed air 80 is provided from the high pressure compressor 24 to the turbine engine combustor 26. Thus, in the first (low speed) operating state, the flow control device 104 is arranged to restrict (i.e., block) the ramjet bleed air inlet 98, thereby permitting the compressed air 80 to flow to the combustor 26. In addition, in the first operating state, the flow control device 104 allows a flow of compressor bleed air 106 to flow through the compressor bleed air outlet 100. The compressor bleed air 106 may be utilized for various operations of the propulsion system 4, and/or the aircraft 2, such as for cooling various engine components of the propulsion system 4, and/or for environmental control within the aircraft 2. FIG. 6B, on the other hand, depicts an arrangement of the flow control device 104 in the second (high speed) operating state of the propulsion system 4. In FIG. 6B, the flow control device 104 is rotated to restrict (i.e., block, or at least partially block) the compressor bleed air outlet 100, and to open the ramjet bleed air inlet 98 to allow the ramjet inlet bleed airflow 82 to flow through the bleed valve 96 and to the turbine engine combustor 26. In the second operating state, when the compressor section may be made inactive, the pressure from the ramjet inlet bleed airflow 82 may restrict the compressed air 80 from flowing to the combustor 26.

In an alternate arrangement, although not shown in the figures, the combustor inlet flow control device 92 may be arranged within the high pressure compressor 24 (i.e., between compressor stages within the high pressure compressor 24) rather than being arranged with the outlet end 94 of the high pressure compressor 24. In this case, the flow control device 104 could be rotated between the position shown in FIG. 6A and the position shown in FIG. 6B so as to allow some of the compressor bleed air 106 from the high pressure compressor 24 to pass through the compressor bleed air outlet 100, while also allowing some of the ramjet inlet bleed air 82 to flow through the compressor bleed air outlet 100. This would generally be in the first (low speed) operating state so as to allow some compressor bleed air 106 from the high pressure compressor 24 to bleed off of the high pressure compressor 24 for operability of the engine 10 under certain conditions.

Referring back to FIG. 2, the propulsion system 4 includes a fuel tank 86. The fuel tank 86 may be arranged within the wings 3 or the fuselage 5 of the aircraft 2 (see FIG. 1), and stores a fuel for operation of the ramjet engine 6 and the turbine engine 10. In operation of the propulsion system 4 in the first (low speed) operating state, the inlet airflow 13 is provided through the propulsion system inlet 52 to the propulsion system 4. The turbine engine inlet section restriction device 54 is actuated to the open state, such that the airflow inlet doors 56 are arranged as shown in FIG. 2. The turbine inlet airflow 58 is therefore permitted to flow to the turbine engine inlet 60 and to the fan assembly 14. A core engine inlet airflow 88 flows through the annular inlet 20 into the compressor section 21, where it is compressed to generate the compressed air 80. The flow control doors 74 are actuated to the open position (FIG. 3) and the compressed air 80 flows through the axial flow passages 70 (FIG. 3) of the combustor inlet flow control device 66 to the turbine engine combustor 26. The flow control doors 74 being in the open position close off the ramjet bleed air passages 72. Fuel from the fuel tank 86 is provided to the turbine engine combustor 26, and the fuel is mixed with the compressed air 80 to generate a fuel/air mixture that is ignited and burned in the turbine engine combustor 26. Combustion gases from the burned fuel/air mixture flow from the turbine engine combustor 26 to the turbine section 27, thereby causing the high pressure turbine 28 and the low pressure turbine 30 to rotate. The rotation of the high pressure turbine 28 drives the high pressure compressor 24, and the rotation of the low pressure turbine 30 drives the low pressure compressor 22.

The rotation of the low pressure compressor 22 drives the gearbox 43, which in turn drives the accessory gearbox 47 via the driveshaft 45 so as to drive the accessories (e.g., the oil pump 49, the fuel pump 51, and the hydraulic pump 53). Similarly, the rotation of the low pressure compressor 22 drives the fan assembly 14. In the first (low speed) operating state, the gearbox 55 may be disengaged from the auxiliary gearbox 59 via, for example, a clutch device (not shown) between the gearbox 55 and the auxiliary gearbox 59. The combustion gases then exit the turbine section 27 to the jet exhaust nozzle section 32 to provide propulsive thrust.

The fan assembly 14 further provides a bypass airflow 90 to the bypass airflow passage 46, thereby providing the main thrust of the turbine engine 10. In the first operating state, the ramjet engine 6 may be passive and, therefore, the ramjet inlet airflow 62 may merely pass through the ramjet inlet portion 7 and the ramjet combustor 8 as a bypass airflow. Alternatively, once a predetermined Mach number has been reached (e.g., Mach 2.0, for example), the ramjet engine 6 may be made active such that fuel from the fuel tank 86 (or fuel from a different fuel tank for a case where the turbine engine 10 and the ramjet engine 6 may operate using different fuels) is provided to the ramjet fuel injector 9 to generate a fuel/air mixture in the ramjet combustor 8 that is then ignited and burned to generate combustion gases 63 that exit the ramjet combustor 8 and may flow to the jet exhaust nozzle section 32 to provide ramjet thrust.

Figure 7:
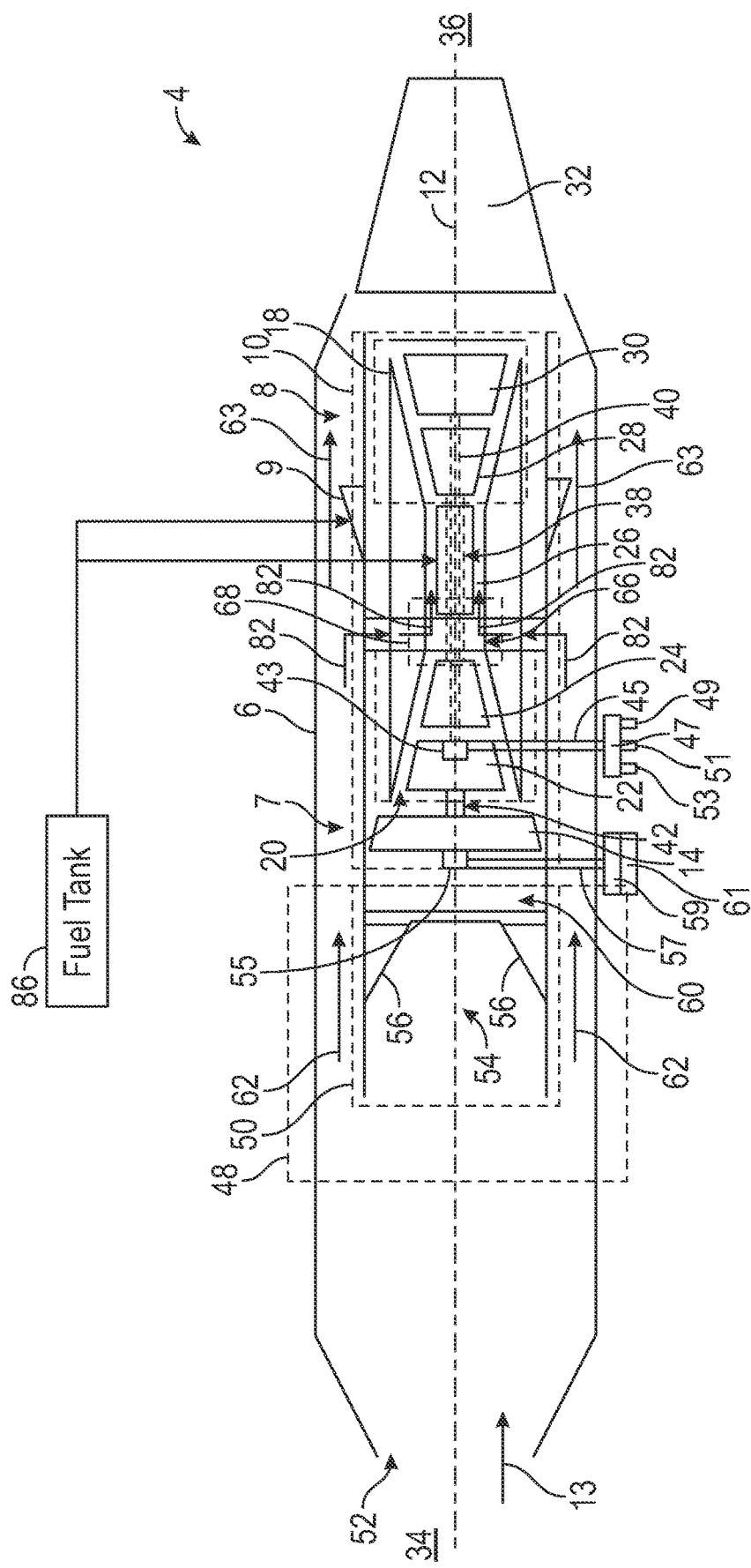
FIG. 7 is a schematic block layout of the propulsion system of FIG. 2, but depicted in a second (high speed) operating state, according to an aspect of the present disclosure.

FIG. 7 is a schematic block layout of the propulsion system of FIG. 2, but depicted in the second (high speed) operating state, according to another aspect of the present disclosure. In FIG. 7, elements that are the same as those of FIG. 2 are shown with the same reference numerals. In the FIG. 7 aspect, the second operating state may be a high speed operating state, such as an operating state for a flight speed of the aircraft 2 of greater than Mach 2.0, or greater than Mach 2.5, for example. In the second (high speed) operating state of FIG. 7, the ramjet engine 6 is active to be the primary source of thrust for the propulsion system 4. Thus, fuel from the fuel tank 86 is provided to the ramjet fuel injector 9 to mix with the ramjet inlet airflow 62 in the ramjet combustor 8, and the resulting fuel/air mixture is ignited and burned to generate ramjet thrust. Of course, there may be a transitional operating state between the first (low speed) operating state and the second (high speed) operating state where the engine configuration transitions from that of the FIG. 2 aspect to that of the FIG. 7 aspect. Such a transitional operating state may occur, for example, between Mach 2.0 and Mach 3.0, as one example.

With regard to the turbine engine 10, in the second (high speed) operating state, the fan assembly 14 and the compressor section 21 may be closed-off (or cocooned), while the turbine engine combustor 26 and the turbine section 27 may remain active in order to drive the accessory gearbox 47 and/or the auxiliary gearbox 59. Therefore, the turbine engine inlet section restriction device 54 is actuated to the closed position so as to restrict the turbine inlet airflow 58 (FIG. 2) from flowing to the turbine engine inlet 60. For example, the airflow inlet doors 56 may be actuated to the closed position as shown in FIG. 7, as compared to the open state shown in FIG. 2, so as to block the turbine inlet airflow 58. The combustor inlet flow control device 66 may be actuated such that the flow control doors 74 are in the closed position (flow control door 74(a) of FIG. 3) so as to close-off the axial flow passages 70 and to open the ramjet bleed air passages 72. Thus, the fan assembly 14 and the compressor section 21 may be considered to be closed-off (or cocooned) from the inlet airflow 13, while the ramjet inlet bleed airflow 82 is permitted to flow through the ramjet bleed air passages 72 (FIG. 3) and into the turbine engine combustor 26. Fuel is provided to the turbine engine combustor 26, where the fuel is mixed with the ramjet inlet bleed airflow 82 to generate a fuel/air mixture that is ignited and burned to generate combustion gases. In the same manner described above, the combustion gases flow through the turbine section 27, causing the high pressure turbine 28 and the low pressure turbine 30 to rotate, which in turn causes the high pressure compressor 24 and the low pressure compressor 22 to rotate. The rotation of the low pressure compressor 22 drives the gearbox 43, which drives the accessory gearbox 47 via the driveshaft 45, thereby operating the accessories connected to the accessory gearbox 47. Similarly, the rotation of the low pressure compressor 22 may cause the fan assembly 14 to rotate, thereby driving the gearbox 55, which drives the auxiliary gearbox 59 via the driveshaft 57, thereby operating the auxiliary generator 61. Since the fan assembly 14 and the compressor section 21 are cocooned, but are driven by the turbine section 27 in the second operating state, some airflow within the compressor section 21 may be generated, and the resulting airflow within the compressor section 21 may merely be bled out tof the compressor section 21 via a bleed valve (not shown). As a result, when the propulsion system 4 is operated in the second (high speed) operating state, the turbine engine 10 can continue to operate using the ramjet inlet bleed airflow 82 in order to drive the accessories and/or the auxiliary generator.

Figure 8:
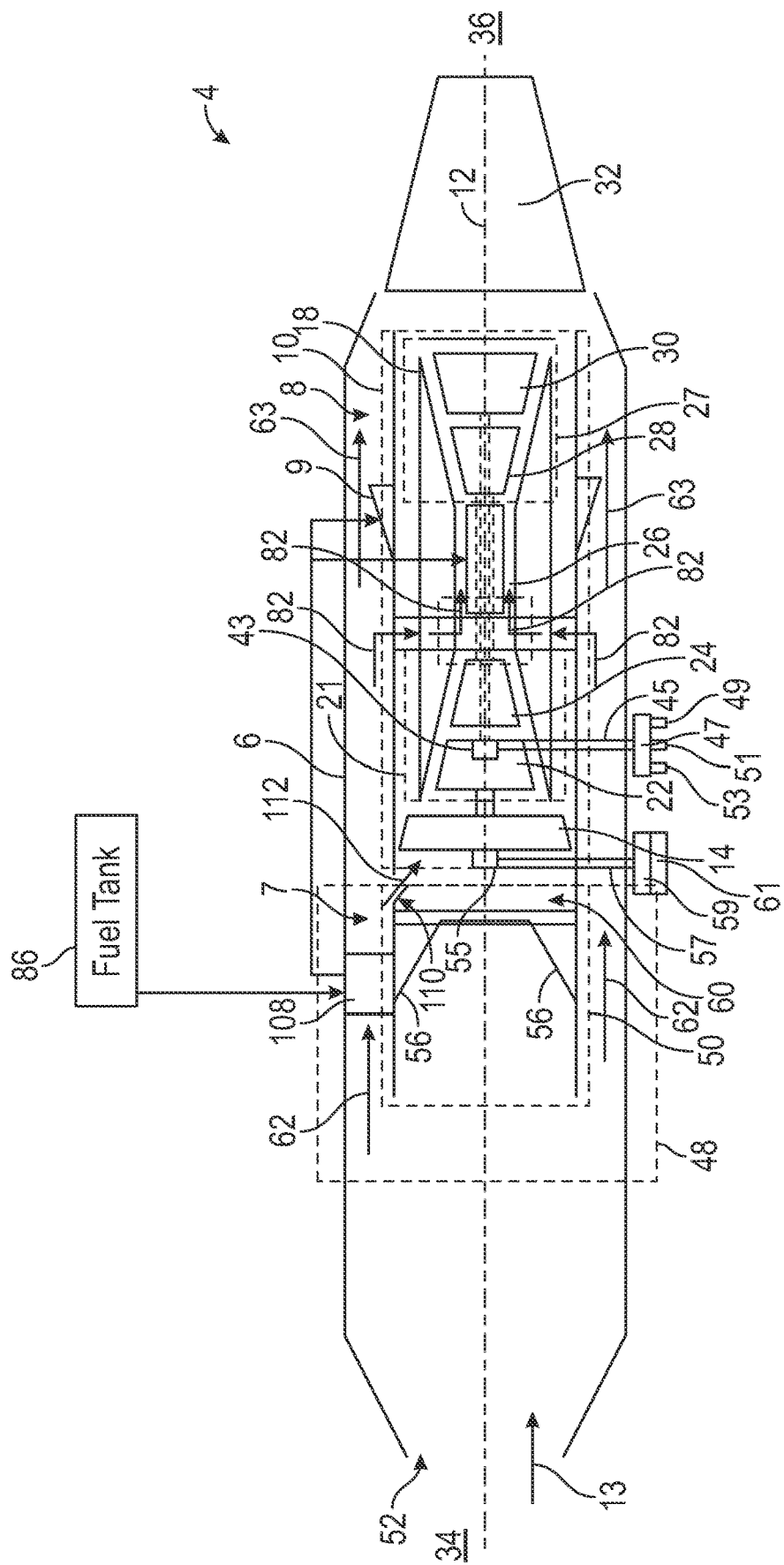
FIG. 8 is a schematic block layout of the propulsion system similar to that of FIG. 7, according to another aspect of the present disclosure.

FIG. 8 is a schematic block layout of the propulsion system similar to that of FIG. 7, according to another aspect of the present disclosure. In FIG. 8, elements that are the same as those of FIG. 7 are shown with the same reference numerals. One difference between the FIG. 7 aspect and the FIG. 8 aspect is that the propulsion system 4 in FIG. 8 includes a heat exchanger 108, which may be arranged in the ramjet inlet 7, to cool a portion of the ramjet inlet airflow 62. The turbine engine inlet 60 also includes at least one cooled airflow passage 110. Fuel from the fuel tank 86 may flow through the heat exchanger 108 prior to being provided to the turbine engine combustor 26 and/or to the ramjet fuel injector 9. The fuel may provide for cooling the ramjet inlet airflow 62 and a cooled inlet air 112 that is generated by the heat exchanger 108 is provided to the turbine engine inlet 60. Thus, with the FIG. 8 aspect, the cooled inlet air 112 can help to purge the closed off compressor section 21 in the second (high speed) operating state.

Figure 9:
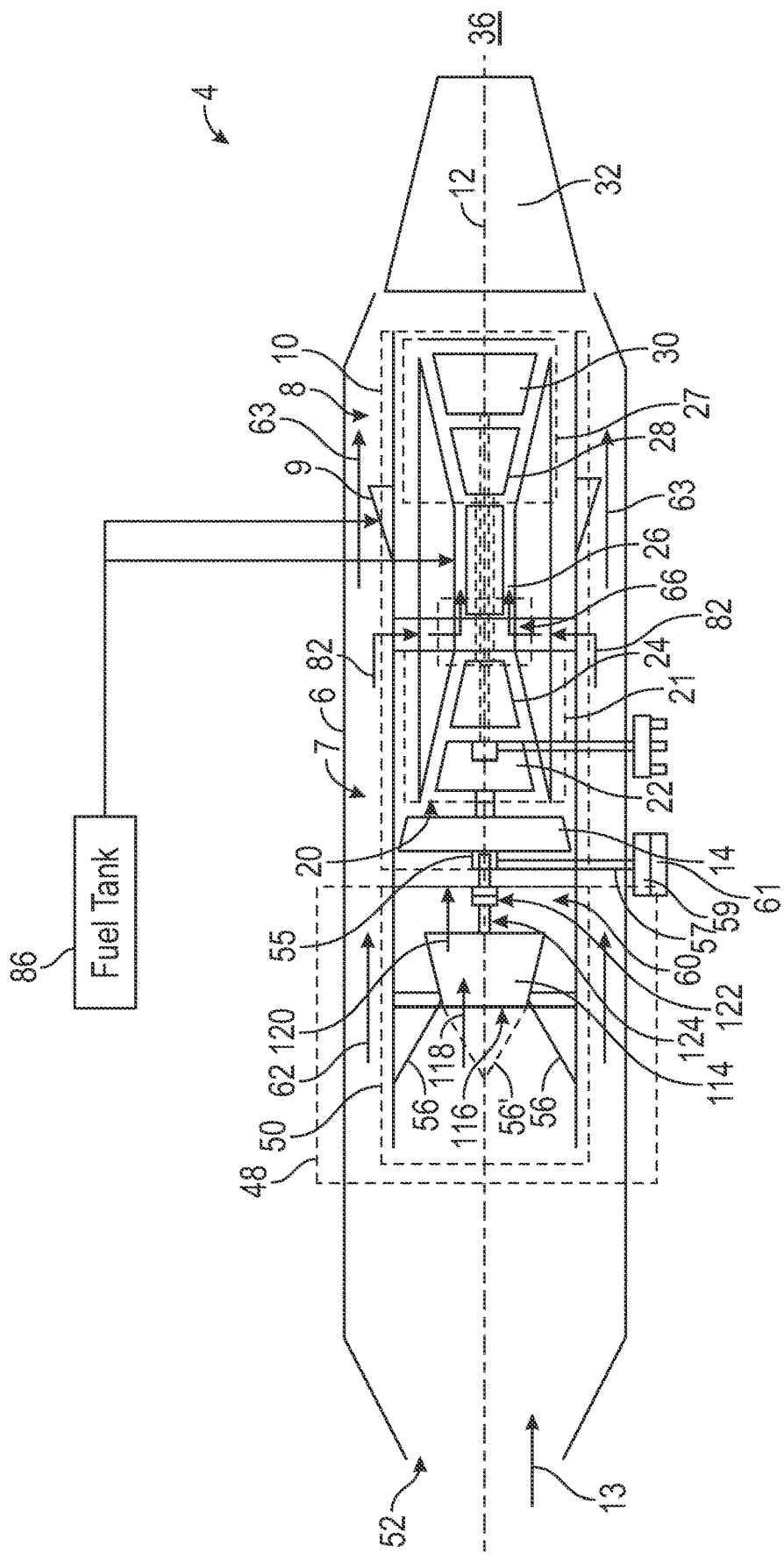
FIG. 9 is a schematic block layout of the propulsion system similar to that of FIG. 7, according to another aspect of the present disclosure.

FIG. 9 is a schematic block layout of the propulsion system similar to that of FIG. 7, according to another aspect of the present disclosure. In FIG. 9, elements that are the same as those of FIG. 7 are shown with the same reference numerals. One difference between the FIG. 7 aspect and the FIG. 9 aspect is that the turbine engine inlet portion 50 in FIG. 9 includes an expansion turbine 114 that includes an expansion turbine inlet 116. The expansion turbine inlet 116 takes in an inlet airflow 118 and expands the inlet airflow 118 to provide cooling to the inlet airflow 118. In the first (low speed) operating state, the expansion turbine inlet 116 may be blocked by the airflow inlet doors 56 when airflow inlet doors 56 are in a open position (i.e. open to allow the inlet airflow 13 to bypass the expansion turbine 114 and to flow to the turbine engine inlet 60). For reference purposes, the airflow inlet doors 56' are shown in dashed lines in the open position for the first (low speed) operating state. When airflow inlet doors 56 are in a closed position as shown in FIG. 9, the inlet airflow 118 is permitted to flow to the expansion turbine 114 and a cooled inlet airflow 120 from the expansion turbine 114 may then be provided to the fan assembly 14 and to the annular inlet 20 of the core engine 16 so as to provide some cooling to the compressor section 21 during the second (high speed) operating state.

The expansion turbine 114 may be drivingly connected with the fan assembly 14 and/or the gearbox 55 via a driveshaft 124, which may include a clutch device 122. In the first (low speed) operating state, the clutch device 122 may be disengaged, while in the second (high speed) operating state, the clutch device 122 may be engaged so that the expansion turbine 114 provides some rotational force to the gearbox 55, and by virtue of the gearbox 55 being drivingly connected with the auxiliary gearbox 59, can drive the auxiliary gearbox 59 and the auxiliary generator 61. Additionally, by virtue of the driving connection from the fan assembly 14 to the low pressure compressor 30, the expansion turbine 114 can provide some rotational work to the low pressure spool 41 to relieve some of the work required by the low pressure compressor 30.

Figure 10:
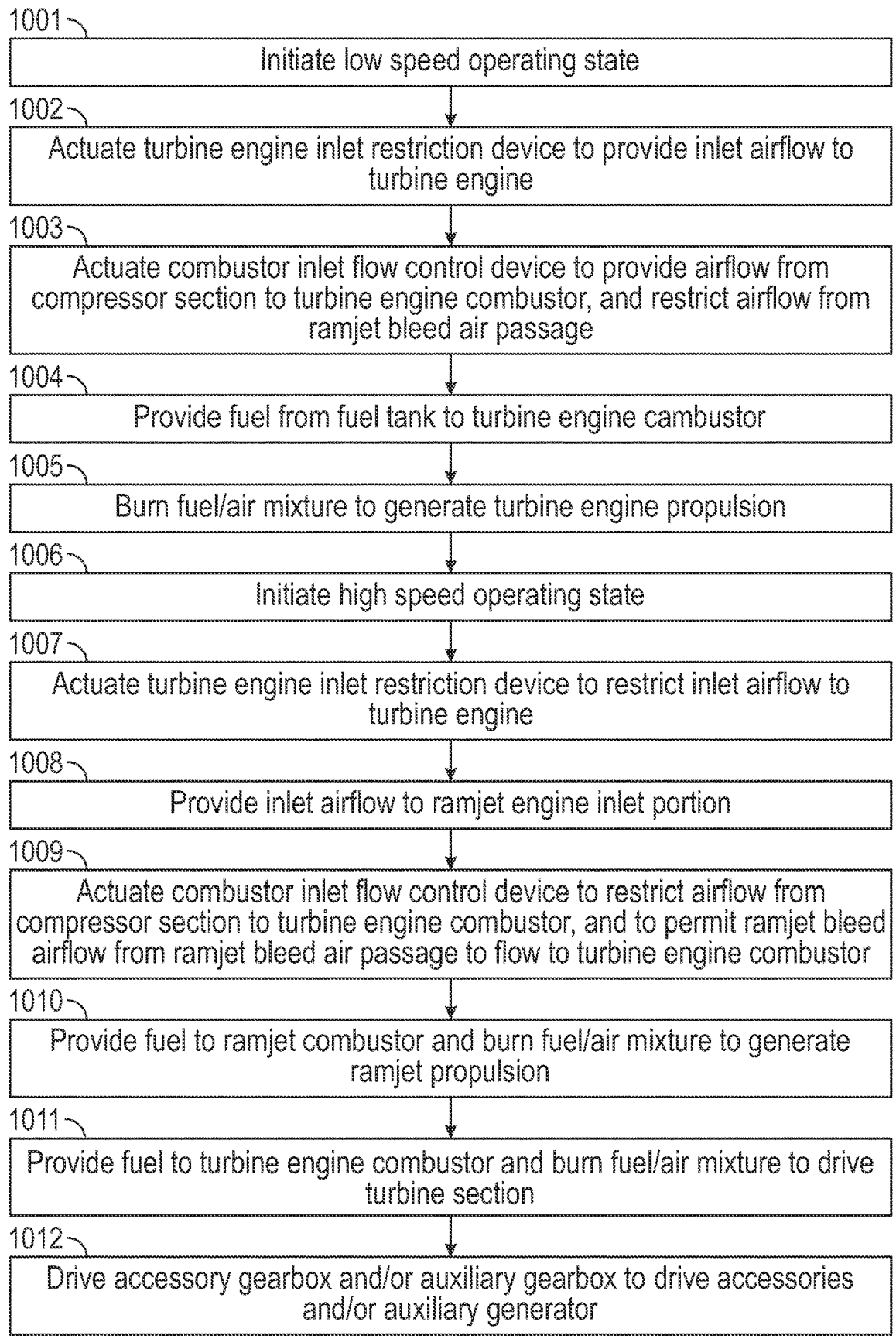
FIG. 10 is a flow chart of process steps for a method of operating a propulsion system, according to an aspect of the present disclosure.

FIG. 10 is a flow chart of process steps for a method of operating the propulsion system 4, according to an aspect of the present disclosure. The method of operating the propulsion system 4 may be implemented in any of the foregoing aspects of FIG. 1 to FIG. 9. In the method, when the propulsion system 4 is first started-up, a low speed operating state is initiated in step 1001. In the low speed operating state, in step 1002, as shown in FIG. 2, for example, the turbine engine inlet section restriction device 54 is actuated to permit the turbine inlet airflow 58 to flow to the turbine engine inlet 60 of the turbine engine 10. As was described above for FIG. 2, the airflow inlet doors 56 may be actuated to the open position to allow the turbine inlet airflow 58 to flow into the turbine engine inlet 60. In step 1003, the combustor inlet flow control device 66 is actuated to provide the compressed air 80 from the compressor section 21 to the turbine engine combustor 26, and to restrict the ramjet inlet bleed airflow 82 from passing through the ramjet bleed air passages 72. As was described above in FIG. 3, the flow control doors 74 may be actuated to control the airflow to the turbine engine combustor 26. In step 1004, fuel is provided from the fuel tank 86 to the turbine engine combustor 26, and, as was described above, in step 1005, the fuel/air mixture is burned to generate combustion gases and to provide turbine engine propulsion. In addition, as was described above, the ramjet engine 6 may be passive in the first operating state and the ramjet inlet airflow 62 may merely pass through the ramjet engine 6 as a bypass airflow.

Once a desired flight speed is reached by the aircraft 2 (e.g., about Mach 2.5, or as the aircraft may be approaching Mach 2.5, such as Mach 2.0, or Mach 1.5), in step 1006, the second (high speed) operating state is initiated. In step 1007, the turbine engine inlet section restriction device 54 is actuated to restrict the turbine inlet airflow 58 from flowing to the turbine engine inlet 60 of the turbine engine 10. As was described above for FIG. 7, the airflow inlet doors 56 may be actuated to the closed position to restrict the turbine inlet airflow 58 from flowing into the turbine engine inlet 60. In step 1008, the ramjet inlet airflow 62 is provided to the ramjet inlet 7. In step 1009, the combustor inlet flow control device 66 is actuated to restrict the airflow from the compressor section 21 from flowing to the turbine engine combustor 26, and to permit the ramjet inlet bleed airflow 82 to pass through the ramjet bleed air passages 72 and into the turbine engine combustor 26. As was described above with respect to the FIG. 3 aspect, the flow control doors 74 may be actuated to the closed position (flow control door 74(a)) to control the airflow to the turbine engine combustor 26 from the ramjet inlet bleed air passages 72.

In step 1010, fuel is provided from the fuel tank 86 to the ramjet fuel injector 9 to mix with the ramjet inlet airflow 62, and the fuel/air mixture is ignited and burned in the ramjet combustor 8 to generate ramjet propulsion. In step 1011, fuel is provided from the fuel tank 86 to the turbine engine combustor 26 to mix with the ramjet inlet bleed airflow 82, and the fuel/air mixture is burned in the turbine engine combustor 26 to drive the turbine section 27. In step 1012, as was described above with regard to FIG. 7, the driving of the low pressure turbine 30 of the turbine section 27 in the high-speed operating state causes the low pressure compressor 22 to rotate, which in turn drives the accessory gearbox 47 that drives the accessories connected thereto. When the auxiliary gearbox 59 is included, the driving of the low pressure turbine 30 may also drive the fan assembly 14, which in turn drives the auxiliary gearbox 59, so as to drive the auxiliary generator 61. Thus, the method provides for the ability of the turbine engine 10 to be operated in the high speed operating state in order to drive the accessories, while the ramjet engine 6 may be operated as the primary source of propulsion.

Further aspects of the present disclosure are provided by the subject matter of the following clauses.

A propulsion system comprises a turbine engine including a turbine engine inlet, a compressor section, a turbine engine combustor, and a turbine section, a ramjet engine including a ramjet inlet portion having at least one ramjet bleed air passage in airflow communication with the turbine engine combustor, and a ramjet combustor, a turbine engine inlet section restriction device arranged to permit an inlet airflow to the turbine engine inlet in a first operating state of the propulsion system, and to restrict the inlet airflow to the turbine engine inlet in a second operating state of the propulsion system, a combustor inlet flow control device that, in the first operating state, (a) provides an airflow from the compressor section to the turbine engine combustor, and (b) restricts an airflow from flowing from the ramjet bleed air passages to the turbine engine combustor, and, in the second operating state, (c) provides a ramjet inlet bleed airflow from the at least one ramjet bleed air passage to the turbine engine combustor, and at least one accessory gearbox drivingly connected with the compressor section and including at least one accessory component that is driven accessory gearbox.

The propulsion system according to the preceding clause, in the first operating state, (i) the turbine engine inlet section restriction device permitting the inlet airflow to flow to the turbine engine inlet, (ii) the combustor inlet flow control device permits the airflow to flow from the compressor section to the turbine engine combustor, and restricts the ramjet inlet bleed airflow from flowing through the ramjet bleed air passages to the turbine engine combustor, and (iii) the turbine engine combustor is provided with fuel to generate turbine engine combustion that drives the turbine section, and to provide turbine engine propulsion, and in the second operating state, (iv) the turbine engine inlet section restriction device restricts the inlet airflow from flowing to the turbine engine inlet, (v) the combustor inlet flow control device restricts the airflow from flowing from the compressor section to the turbine engine combustor, and permits the ramjet inlet bleed airflow to flow through the ramjet bleed air passages to the turbine engine combustor, (vi) the turbine engine combustor is provided with fuel to generate turbine engine combustion that drives the turbine section, (vii) the turbine section drives the compressor section, which in turn drives the at least one accessory gearbox to operate the at least one accessory component, and (viii) the ramjet combustor is provided with fuel to provide ramjet engine propulsion.

The propulsion system according to any preceding clause, in the first operating state, the turbine engine being operational as a primary propulsion source and the ramjet engine is passive, and, in the second operating state, the ramjet engine is operational as the primary propulsion source and, in the turbine engine, the turbine engine combustor and the turbine section of the turbine engine are operational via the ramjet inlet bleed airflow so as to drive the compressor section and the at least one accessory gearbox for providing accessory services.

The propulsion system according to any preceding clause, the combustor inlet flow control device comprising an airflow bleed valve arranged at a downstream end of the compressor section, the airflow bleed valve including a ramjet bleed air inlet passage, a compressor bleed air outlet passage, and a flow control device, in the first operating state, the flow control device is actuated to close the ramjet bleed air inlet passage and to open the compressor bleed air outlet passage, and, in the second operating state, the flow control device is actuated to open the ramjet bleed air inlet passage so as to permit the ramjet inlet bleed airflow to flow through the combustor inlet flow control device to the turbine engine combustor and to close the compressor bleed air outlet passage.

The propulsion system according to any preceding clause, in the second operating state, the combustor inlet flow control device further providing a flow of ramjet inlet bleed airflow to the turbine section.

The propulsion system according to any preceding clause, the combustor inlet flow control device being arranged between the compressor section and the turbine engine combustor, and includes a plurality of axial airflow passages arranged between the compressor section and the turbine engine combustor, and a plurality of ramjet bleed air passages that are radial airflow passages, respective ones of the plurality of axial airflow passages being circumferentially aligned with respective ones of the plurality of ramjet bleed air passages.

The propulsion system according to any preceding clause, the combustor inlet flow control device including a plurality of flow control doors, each respective flow control door controlling the airflow through a respective axial airflow passage and controlling the airflow through a respective ramjet bleed air passage.

The propulsion system according to any preceding clause, in the second operating state, the plurality of flow control doors being actuated to a closed position with respect to the axial airflow passages, thereby restricting the airflow from flowing from the compressor section to the turbine engine combustor, and, to an open position with respect to the ramjet bleed air passages, thereby permitting the ramjet inlet bleed airflow to flow through the ramjet bleed air passages to the turbine engine combustor.

The propulsion system according to any preceding clause, in the first operating state, the plurality of flow control doors being actuated to an open position with respect to the axial airflow passages, thereby permitting the airflow to flow from the compressor section to the turbine engine combustor, and, to a closed position with respect to the ramjet bleed air passages, thereby restricting the ramjet inlet bleed airflow from flowing through the ramjet bleed air passages to the turbine engine combustor.

The propulsion system according to any preceding clause, in the first operating state, the plurality of flow control doors being actuated by a high pressure airflow generated by the compressor section.

The propulsion system according to any preceding clause, the first operating state of the propulsion system being a low speed operating state, and the second operating state of the propulsion system is a high speed operating state.

The propulsion system according to any preceding clause, the low speed operating state being an operating state of an airspeed up to Mach 2.5, and the high speed operating state is an operating state of an airspeed above Mach 2.5.

The propulsion system according to any preceding clause, further comprising a heat exchanger arranged in the ramjet inlet portion and arranged to cool a portion of a ramjet inlet airflow, and at least one cooled air flow passage that, in the second operating state, provides a flow of cooled inlet air that is generated by the heat exchanger to the turbine engine inlet.

The propulsion system according to any preceding clause, further comprising a fuel storage tank in fluid communication with the heat exchanger, the ramjet inlet airflow being cooled by fuel flowing from the fuel storage tank through the heat exchanger.

The propulsion system according to any preceding clause, the turbine engine further comprising an expansion turbine arranged at the turbine engine inlet, and, in the second operating state, the expansion turbine provides a cooled inlet airflow to the compressor section.

The propulsion system according to any preceding clause, the expansion turbine being drivingly connected with an auxiliary gearbox that drives an auxiliary component.

The propulsion system according to any preceding clause, the auxiliary component being an auxiliary generator. The propulsion system according to any preceding clause, wherein the combustor inlet flow control device comprised a plurality of guide vanes, each respective guide vane being rotatable to an open position and to a closed position, the open position permitting the flow of compressed air from the compressor section to flow to the turbine combustor, and the closed position restricting the flow of compressed air from the compressor section from flowing to the turbine combustor.

The propulsion system according to any preceding clause, further including a fuel tank, wherein fuel is provided from the fuel tank to at least one of the turbine engine combustor and/or to a ramjet fuel injector of the ramjet engine.

The propulsion system according to any preceding clause, wherein, in the first operating state, the fuel is provided from the fuel tank to the turbine engine combustor, and in the second operating state, the fuel is provided to the turbine engine combustor and to the ramjet fuel injector.

The propulsion system according to any preceding clause, further including a heat exchanger arranged in the ramjet inlet portion, the fuel tank being in fluid communication with the heat exchanger, the fuel flowing through the heat exchanger and being provided to at least one of the turbine engine combustor and/or the ramjet fuel injector.

A method of operating a propulsion system, the propulsion system including (i) a turbine engine including a turbine engine inlet, a compressor section, a turbine engine combustor, and a turbine section, (ii) a ramjet engine arranged in parallel with the turbine engine, the ramjet engine including a ramjet inlet portion having at least one ramjet bleed air passage in airflow communication with the turbine engine combustor, and a ramjet combustor, (iii) a turbine engine inlet section restriction device arranged to permit an inlet airflow to the turbine engine inlet in a first operating state of the propulsion system, and to restrict the inlet airflow to the turbine engine inlet in a second operating state of the propulsion system, (iv) a combustor inlet flow control device that, in the first operating state, (a) provides an airflow from the compressor section to the turbine engine combustor, and (b) restricts an airflow from flowing from the ramjet bleed air passages to the turbine engine combustor, and, in the second operating state, (c) provides a ramjet inlet bleed airflow from the at least one ramjet bleed air passage to the turbine engine combustor, and (v) at least one accessory gearbox drivingly connected with the compressor section and including at least one accessory component that is driven accessory gearbox, the method comprising, in the first operating state, (a) actuating the turbine engine inlet section restriction device to provide the inlet airflow to the turbine engine inlet, (b) actuating the combustor inlet flow control device to provide the airflow from the compressor section to the turbine engine combustor, and to restrict the ramjet inlet bleed airflow from flowing through the ramjet bleed air passages to the turbine engine combustor, and (c) providing fuel to the turbine engine combustor to generate turbine engine combustion to drive the turbine section, and to provide turbine engine propulsion, and in the second operating state, (d) actuating the turbine engine inlet section restriction device to restrict the inlet airflow from flowing to the turbine engine inlet, (e) actuating the combustor inlet flow control device to restrict the airflow from flowing from the compressor section to the turbine engine combustor, and to provide the ramjet inlet bleed airflow to flow through the ramjet bleed air passages to the turbine engine combustor, (f) providing fuel to the turbine engine combustor to generate turbine engine combustion that drives the turbine section and also drives the compressor section, (g) driving, by the compressor section, the at least one accessory gearbox to operate the least one accessory component, and (h) providing fuel to the ramjet combustor to provide ramjet engine propulsion.

The method according to any preceding clause, the propulsion system further including a heat exchanger arranged in the ramjet inlet portion and arranged to cool a portion of a ramjet inlet airflow, the method further comprising, in the second operating state, providing a flow of cooled inlet air that is generated by the heat exchanger to the turbine engine inlet.

The method according to any preceding clause, the combustor inlet flow control device comprising an airflow bleed valve arranged at a downstream end of the compressor section, the airflow bleed valve including a ramjet bleed air inlet passage, a compressor bleed air outlet passage, and a flow control device, the method further comprising in the first operating state, actuating the flow control device to close the ramjet bleed air inlet passage and to open the compressor bleed air outlet passage, and, in the second operating state, actuating the flow control device to open the ramjet bleed air inlet passage so as to permit the ramjet inlet bleed airflow to flow through the combustor inlet flow control device to the turbine engine combustor and to close the compressor bleed air outlet passage.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A propulsion system comprising:
  a turbine engine including a turbine engine inlet, a compressor section, a turbine engine combustor, and a turbine section;
  a ramjet engine including a ramjet inlet portion and a ramjet combustor, the ramjet inlet portion having at least one ramjet bleed air passage in airflow communication with the turbine engine combustor, the at least one ramjet bleed air passage being arranged axially downstream of a last compressor stage of the turbine engine and upstream of the turbine engine combustor, wherein the at least one ramjet bleed air passage directs a ramjet inlet bleed airflow from the ramjet inlet portion upstream of the compressor section to the turbine engine combustor downstream of the last compressor stage;
  a turbine engine inlet section restriction device arranged to permit an inlet airflow to the turbine engine inlet in a first operating state of the propulsion system, and to restrict the inlet airflow to the turbine engine inlet in a second operating state of the propulsion system;
  a combustor inlet flow control device in airflow communication with the at least one ramjet bleed air passage and the turbine engine combustor, the combustor inlet flow control device being axially aligned with the at least one ramjet bleed air passage such that the combustor inlet flow control device is arranged axially downstream of the last compressor stage of the turbine engine and upstream of the turbine engine combustor, the combustor inlet flow control device comprising a movable flow control device that is movable between an open position that allows the ramjet inlet bleed airflow to flow from the at least one ramjet bleed air passage to the turbine engine combustor and a closed position that restricts the ramjet inlet bleed airflow from flowing from the at least one ramjet bleed air passage to the turbine engine combustor,
    wherein, in the first operating state, the combustor inlet flow control device positions the movable flow control device in the closed position to restrict the ramjet inlet bleed airflow from flowing from the at least one ramjet bleed air passage to the turbine engine combustor through the combustor inlet flow control device while allowing a flow of compressed air from the compressor section to the turbine engine combustor, and, in the second operating state, positions the movable flow control device in the open position to provide the ramjet inlet bleed airflow from the at least one ramjet bleed air passage to the turbine engine combustor through the combustor inlet flow control device; and
  at least one accessory gearbox drivingly connected with the compressor section and including at least one accessory component that is driven by the at least one accessory gearbox.

2. The propulsion system according to claim 1, wherein combustor inlet flow control device comprises an airflow bleed valve including a compressor bleed outlet passage, a ramjet bleed air inlet passage that defines a portion of the at least one ramjet bleed air passage, and the movable flow control device,
  in the first operating state, the movable flow control device is actuated to close the ramjet bleed air inlet passage and to open the compressor bleed air outlet passage, and
  in the second operating state, the movable flow control device is actuated to open the ramjet bleed air inlet passage so as to permit the ramjet inlet bleed airflow to flow through the combustor inlet flow control device to the turbine engine combustor and to close the compressor bleed air outlet passage.

3. The propulsion system according to claim 1, wherein,
  in the first operating state, the turbine engine combustor is provided with fuel that mixes with the compressed air to generate turbine engine combustion that drives the turbine section, and to provide turbine engine propulsion, and in the second operating state, the turbine engine combustor is provided with fuel that mixes with the ramjet inlet bleed airflow to generate turbine engine combustion that drives the turbine section, the turbine section drives the compressor section, which in turn drives the at least one accessory gearbox to operate the at least one accessory component, and the ramjet combustor is provided with fuel to provide ramjet engine propulsion.

4. The propulsion system according to claim 3, wherein, in the first operating state, the turbine engine is operational as a primary propulsion source and the ramjet engine is passive, and, in the second operating state, the ramjet engine is operational as the primary propulsion source and, in the turbine engine, the turbine engine combustor and the turbine section of the turbine engine are operational via the ramjet inlet bleed airflow so as to drive the compressor section and the at least one accessory gearbox for providing accessory services.

5. The propulsion system according to claim 1, wherein the combustor inlet flow control device includes a plurality of axial airflow passages arranged between the compressor section and the turbine engine combustor, the at least one ramjet bleed air passage including a plurality of radial airflow passages, respective ones of the plurality of axial airflow passages being circumferentially aligned with respective ones of the plurality of radial airflow passages.

6. The propulsion system according to claim 5, wherein the movable flow control device includes a plurality of flow control doors, each respective flow control door controlling the flow of compressed air through a respective axial airflow passage and controlling the ramjet inlet bleed airflow through a respective radial airflow passage.

7. The propulsion system according to claim 6, wherein, in the second operating state, the plurality of flow control doors are actuated to the open position to permit the ramjet bleed airflow to flow to the turbine engine combustor through the plurality of radial airflow passages while closing the plurality of axial airflow passages, thereby restricting the flow of compressed air from flowing from the compressor section to the turbine engine combustor.

8. The propulsion system according to claim 6, wherein, in the first operating state, the plurality of flow control doors are actuated to the closed position to restrict the ramjet inlet bleed airflow from flowing to the turbine engine combustor through the plurality of radial airflow passages while opening the axial airflow passages, thereby permitting the flow of compressed air to flow from the compressor section to the turbine engine combustor.

9. The propulsion system according to claim 8, wherein, in the first operating state, the plurality of flow control doors are actuated by the flow of compressed air generated by the compressor section.

10. The propulsion system according to claim 1, wherein the first operating state of the propulsion system is a low speed operating state, and the second operating state of the propulsion system is a high speed operating state.

11. The propulsion system according to claim 10, wherein the low speed operating state is an operating state of an airspeed up to Mach 2.5, and the high speed operating state is an operating state of an airspeed above Mach 2.5.

12. The propulsion system according to claim 1, further comprising:
a heat exchanger arranged in the ramjet inlet portion and arranged to cool a portion of a ramjet inlet airflow; and
at least one cooled air flow passage that, in the second operating state, provides a flow of cooled inlet air that is generated by the heat exchanger to the turbine engine inlet.

13. The propulsion system according to claim 12, further comprising a fuel storage tank in fluid communication with the heat exchanger, wherein the ramjet inlet airflow is cooled by fuel flowing from the fuel storage tank through the heat exchanger.

14. The propulsion system according to claim 1, wherein the turbine engine further comprises an expansion turbine arranged at the turbine engine inlet, and, in the second operating state, the expansion turbine provides a cooled inlet airflow to the compressor section.

15. The propulsion system according to claim 14, wherein the expansion turbine is drivingly connected with an auxiliary gearbox that drives an auxiliary component.

16. The propulsion system according to claim 1, further comprising a fan assembly arranged upstream of the compressor section.

17. A method of operating a propulsion system, the propulsion system including a turbine engine, and a ramjet engine, the method comprising:
in a first operating state,
(a) actuating a turbine engine inlet section restriction device to provide an inlet airflow to a turbine engine inlet;
(b) actuating a movable flow control device of a combustor inlet flow control device to provide a flow of compressed air from a compressor section to a turbine engine combustor, and to restrict a ramjet inlet bleed airflow from flowing from a ramjet inlet portion of the propulsion system through at least one ramjet bleed air passage to the turbine engine combustor, the at least one ramjet bleed air passage being arranged axially downstream of a last compressor stage of the turbine engine and upstream of the turbine engine combustor, and the combustor inlet flow control device being axially aligned with the at least one ramjet bleed air passage such that the combustor inlet flow control device is arranged axially downstream of the last compressor stage of the turbine engine and upstream of the turbine engine combustor; and
(c) providing fuel to the turbine engine combustor to mix with the compressed air to generate turbine engine combustion to drive a turbine section, and to provide turbine engine propulsion; and
in a second operating state,
(i) actuating the turbine engine inlet section restriction device to restrict the inlet airflow from flowing to the turbine engine inlet;
(ii) actuating movable flow control device of the combustor inlet flow control device to restrict the flow of compressed air from flowing from the compressor section to the turbine engine combustor, and to provide the ramjet inlet bleed airflow from the at least one ramjet bleed air passage to the turbine engine combustor through the combustor inlet flow control device;
(iii) providing fuel to the turbine engine combustor to mix with the ramjet inlet bleed airflow to generate turbine engine combustion that drives the turbine section and also drives the compressor section;
(iv) driving, by the compressor section, at least one accessory gearbox to operate at least one accessory component; and
(v) providing fuel to a ramjet combustor to provide ramjet engine propulsion.

18. The method according to claim 17, wherein the propulsion system further includes a heat exchanger arranged in a ramjet inlet portion and arranged to cool a portion of a ramjet inlet airflow, the method further comprising, in the second operating state, providing a flow of cooled inlet air that is generated by the heat exchanger to the turbine engine inlet.

\* \* \* \* \*